(12) United States Patent
Sheng et al.

(10) Patent No.: US 12,104,725 B2
(45) Date of Patent: Oct. 1, 2024

(54) CABLE FIXING DEVICE AND ANTENNA

(71) Applicants: PROSE TECHNOLOGIES (SUZHOU) CO., LTD., Suzhou (CN); PROSE TECHNOLOGIES LLC, Mount Olive, NJ (US)

(72) Inventors: Linfeng Sheng, Suzhou (CN); Junyang Huang, Suzhou (CN); Youfang Huangfu, Suzhou (CN)

(73) Assignees: PROSE TECHNOLOGIES (SUZHOU) CO., LTD., Suzhou (CN); PROSE TECHNOLOGIES LLC, Mount Olive, NJ (US)

( * ) Notice: Subject to any disclaimer, the term of this patent is extended or adjusted under 35 U.S.C. 154(b) by 149 days.

(21) Appl. No.: 17/867,065

(22) Filed: Jul. 18, 2022

(65) Prior Publication Data

US 2022/0349496 A1 Nov. 3, 2022

Related U.S. Application Data

(63) Continuation-in-part of application No. 17/383,053, filed on Jul. 22, 2021, now Pat. No. 11,394,189.

(30) Foreign Application Priority Data

Dec. 29, 2020 (CN) .......................... 202011588474.4

(51) Int. Cl.
*F16L 3/00* (2006.01)
*F16L 3/02* (2006.01)
(Continued)

(52) U.S. Cl.
CPC . *F16L 3/02* (2013.01); *F16L 3/08* (2013.01); *F16L 3/127* (2013.01); *H01Q 1/12* (2013.01); *H02G 3/32* (2013.01)

(58) Field of Classification Search
CPC ... H02G 3/32; H01R 9/16; F16L 3/127; F16L 3/13; F16L 3/00; F16L 3/08; F16M 3/127
See application file for complete search history.

(56) References Cited

U.S. PATENT DOCUMENTS 2,004,679 A 6/1935 Tinnerman
2,065,843 A * 12/1936 Van Uum ............... F16L 3/127
248/71

(Continued)

FOREIGN PATENT DOCUMENTS

CN 205594207 U 9/2016
CN 109891695 A 6/2019
(Continued)

*Primary Examiner* — Tan Le
(74) *Attorney, Agent, or Firm* — ANOVA LAW GROUP, PLLC

(57) ABSTRACT

A cable fixing device includes an upper body to contact a cable, a lower body to travel through an opening of a plate-shaped structure along an engagement direction, and a middle body positioned between the upper body and the lower body along the engagement direction, the middle body to contact a side wall of the opening of the plate-shaped structure, where a height H1 of the sidewall of the opening of the plate-shape structure along the engagement position is smaller than a height H2 of the middle body along the engagement direction, and where a height difference ΔH between H2 and H1 decreases as the cable travels through the upper body along the engagement direction.

20 Claims, 12 Drawing Sheets

(51) Int. Cl.
*F16L 3/08* (2006.01)
*F16L 3/127* (2006.01)
*H01Q 1/12* (2006.01)
*H02G 3/32* (2006.01)

(56) References Cited

U.S. PATENT DOCUMENTS

| | | | |
|---|---|---|---|
| 2,068,932 | A | 1/1937 | Quarnstrom |
| 2,176,405 | A | 10/1939 | Lombard |
| 2,453,980 | A | 11/1948 | Hartman |
| 2,495,848 | A | 1/1950 | Kiesel |
| 3,944,177 | A * | 3/1976 | Yoda .................. F16L 3/08 |
| | | | 248/74.2 |

FOREIGN PATENT DOCUMENTS

| | | |
|---|---|---|
| CN | 110783863 A | 2/2020 |
| FR | 2529722 A1 * | 1/1984 |

* cited by examiner

CABLE FIXING DEVICE AND ANTENNA

CROSS-REFERENCE TO RELATED APPLICATION

This application is a continuation-in-part application of U.S. patent application Ser. No. 17/383,053 filed on Jul. 22, 2021, which claims priority to Chinese Patent Application No. CN202011588474.4, filed on Dec. 29, 2020, the entire contents of both of which are incorporated herein by reference.

TECHNICAL FIELD

The present disclosure relates to the technical field of mechanical fixing and, more particularly, to a cable fixing device for fixing a cable to a plate-shaped structure and an antenna including the cable fixing device.

BACKGROUND

Cable clamps have special requirements when being used to fix antenna cables. For example, assembling may be a problem. Existing ordinary cable clamps are often assembled after the cables are manually held in place in advance. The assembling operation is difficult. Further, space utilization may be another problem. The existing ordinary cable clamps have a main body concentrated on the back of a reflector. Under the circumstance that the space behind current 5G equipment and ordinary antenna is very limited, the ordinary cable clamps are often unable to fit in. Further, reliability may be another problem. The existing cable clamps fix the cables and the cable clamps at the same time. The cables do not contribute to the fixing of the cable clamps. A size of buckle arms of the cable clamps is often determined based on a thickness of the reflector, such that a fixing strength between the buckles and the reflector is limited and the cables easily fall off when the cables swing due to external forces.

SUMMARY

In accordance with the disclosure, there is provided a cable fixing device. The cable fixing device includes: a first arm including a first arm section for holding a cable and a second arm section for fixing the cable to a plate-shaped structure to which the cable fixing device is attached; and a second arm including a third arm section for holding the cable and a fourth arm section for fixing the cable to the plate-shaped structure. The first arm section and the third arm section are configured to cooperatively fix the cable, and the first arm section is connected to the third arm section only through the second arm section and the fourth arm section.

Also in accordance with the disclosure, there is provided an antenna. The antenna includes a transmitter board and a cable fixing device coupled to the transmitter board. The cable fixing device includes: a first arm including a first arm section for holding a cable and a second arm section for fixing the cable to the transmitter board to which the cable fixing device is attached; and a second arm including a third arm section for holding the cable and a fourth arm section for fixing the cable to the transmitter board. The first arm section and the third arm section are configured to cooperatively fix the cable, and the first arm section is connected to the third arm section only through the second arm section and the fourth arm section.

In one aspect, a cable fixing device includes an upper body to contact a cable, a lower body to travel through an opening of a plate-shaped structure along an engagement direction; and a middle body positioned between the upper body and the lower body along the engagement direction, the middle body to contact a side wall of the opening of the plate-shaped structure, where a height H1 of the sidewall of the opening of the plate-shape structure along the engagement position is smaller than a height H2 of the middle body along the engagement direction, and where a height difference ΔH between H2 and H1 decreases as the cable travels through the upper body along the engagement direction.

In another aspect, a cable fixing assembly includes a plate-shaped structure and a cable fixing device, where the cable fixing device includes an upper body to contact a cable, a lower body to travel through an opening of the plate-shaped structure along an engagement direction; and a middle body positioned between the upper body and the lower body along the engagement direction, the middle body to contact a side wall of the opening of the plate-shaped structure, where a height H1 of the sidewall of the opening of the plate-shape structure along the engagement position is smaller than a height H2 of the middle body along the engagement direction, and where a height difference ΔH between H2 and H1 decreases as the cable travels through the upper body along the engagement direction.

In yet another aspect, a cable fixing assembly includes a cable and a cable fixing device, where the cable fixing device includes an upper body to contact the cable, a lower body to travel through an opening of a plate-shaped structure along an engagement direction, and a middle body positioned between the upper body and the lower body along the engagement direction, the middle body to contact a side wall of the opening of the plate-shaped structure, where a height H1 of the sidewall of the opening of the plate-shape structure along the engagement position is smaller than a height H2 of the middle body along the engagement direction, and where a height difference ΔH between H2 and H1 decreases as the cable travels through the upper body along the engagement direction.

BRIEF DESCRIPTION OF THE DRAWINGS

To more clearly illustrate the technical solution of the present disclosure, the accompanying drawings used in the description of the disclosed embodiments are briefly described hereinafter. The drawings described below are merely some embodiments of the present disclosure. Other drawings may be derived from such drawings by a person with ordinary skill in the art without creative efforts and may be encompassed in the present disclosure. Unless otherwise indicated, same numbers in different accompanying drawings may represent same or similar elements. In addition, the accompanying drawings are not necessarily drawn to scale.

DETAILED DESCRIPTION OF THE EMBODIMENTS

Figure 1:
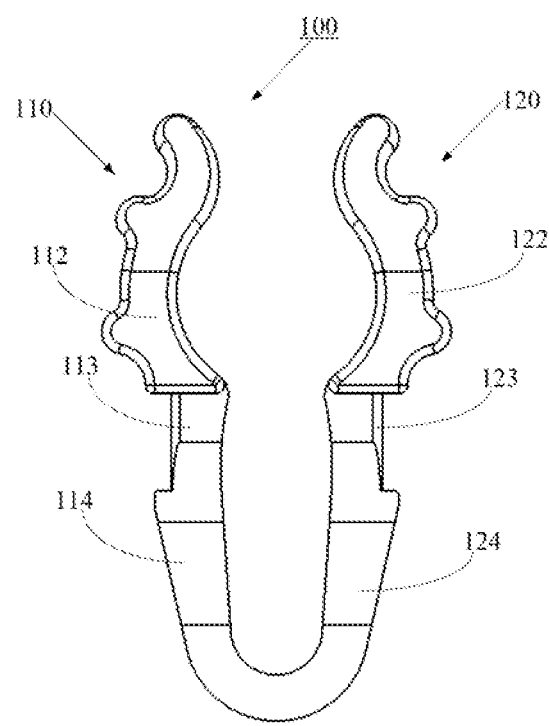
FIG. 1 shows a schematic view of a cable fixing device according to an example embodiment of the present disclosure.

Embodiments of the present disclosure are described in detail below with reference to the accompanying drawings. Same or similar reference numerals in the drawings represent the same or similar elements or elements having the same or similar functions throughout the specification. It will be appreciated that the described embodiments are some rather than all of the embodiments of the present disclosure. Other embodiments obtained by those having ordinary skills in the art on the basis of the described embodiments without inventive efforts should fall within the scope of the present disclosure.

The following technical problems exist in the existing technology.

For example, assembling may be a problem. Existing ordinary cable clamps are often assembled after the cables are manually held in place in advance. The assembling operation is difficult. Further, space utilization may be another problem. The existing ordinary cable clamps have a main body concentrated on the back of a reflector. Under the circumstance that the space behind current 5G equipment and ordinary antenna is very limited, the ordinary cable clamps are often unable to fit in. Further, reliability may be another problem. The existing cable clamps fix the cables and the cable clamps at the same time. The cables do not contribute to the fixing of the cable clamps. A size of buckle arms of the cable clamps is often determined based on a thickness of the reflector, such that a fixing strength between the buckles and the reflector is limited and the cables easily fall off when the cables swing due to external forces.

To address the foregoing technical problems, the present disclosure provides the solutions below.

For the assembling problem, the present disclosure improves a cable clamp installation process. The cable clamp is first snapped into feature holes of the reflector plate, and then the cable is inserted into the cable clamp. The step-by-step assembling is simple and efficient.

For the space utilization problem, in the present disclosure, the cable is inserted after the cable clamp is snapped into the reflector plate to effectively reduce a size of structures for fixing the cable. As such, an installation space on the back of the reflector plate may be effectively reduced to much smaller than a would-be installation space for ordinary cable clamps, and a limit of 5 mm height above the back of the reflector plate often required by 5G systems can be satisfied.

For the reliability problem, the cable clamp according to the present disclosure only needs to ensure the reliable fixing between the cable and the cable clamp. The inserted cable prevents the cable clamp from falling off the reflector plate.

In the process of installation, the cable clamp is fixed first. The cable clamp is snapped into the reflector plate and is self-locked by a fixing structure of the cable clamp. After being installed, the fixing structure of the cable clamp is located at the front of the reflector plate, and the cable is inserted into a clamping structure of the cable clamp still on the back of the reflector plate. The height of the clamping structure of the cable clamp still on the back of the reflector plate is slightly greater than a diameter of the cable, thereby substantially saving the installation space on the back of the reflector plate. After the cable clamp is installed, the cable is inserted into the cable clamp. The clamping structure of the cable clamp engages with the cable and deforms to apply a clamping force to the cable. An amount of deformation of the clamping structure may be adjusted to securely fixing the cable. The inserted cable applies a reverse force to the clamping structure of the cable clamp. The reverse force reinforces the fixing structure of the cable clamp to prevent the cable clamp from falling off the reflector plate, thereby ensuring the reliability of the cable clamp installation.

Through the foregoing technical solutions, the cable fixing device according to the present disclosure effectively saves the installation space to much smaller than the would-be installation space needed for the ordinary cable clamps. In addition, the cable fixing device according to the present disclosure improves the cable installation process, such that the installation is simple, easy to operate, and highly efficient. The cable fixing device according to the present disclosure fixes the cable which at the same time reinforces the fixing of the cable clamp. The reverse force by the cable makes the overall fixing more reliable. Moreover, the cable fixing device according to the present disclosure has a high fault tolerance and reduces impacts of material contraction and expansion and size deviations.

The cable fixing device according to the present disclosure is described in detail below with reference to the accompanying drawings.

FIG. 1 shows a schematic view of a cable fixing device 100 according to an example embodiment of the present disclosure. As shown in FIG. 1, the cable fixing device 100 includes a first arm 110. The first arm 110 includes a first arm section 112 for holding a cable (not shown) and a second arm section 114 for fixing the cable to a plate-shaped structure (not shown) to which the cable fixing device 100 is attached. In addition, the cable fixing device 100 further includes a second arm 120. The second arm 120 includes a third arm section 122 for holding the cable (not shown) and a fourth arm section 124 for fixing the cable to the plate-shaped structure (not shown) to which the cable fixing device 100 is attached. The second arm section 114 and the fourth arm section 124 are connected. As shown in FIG. 1, the second arm section 114 and the fourth arm section 124 are connected through their corresponding lower ends. The first arm section 112 is connected to the third arm section 122 only through the second arm section 114 and the fourth arm section 124.

Figure 2:
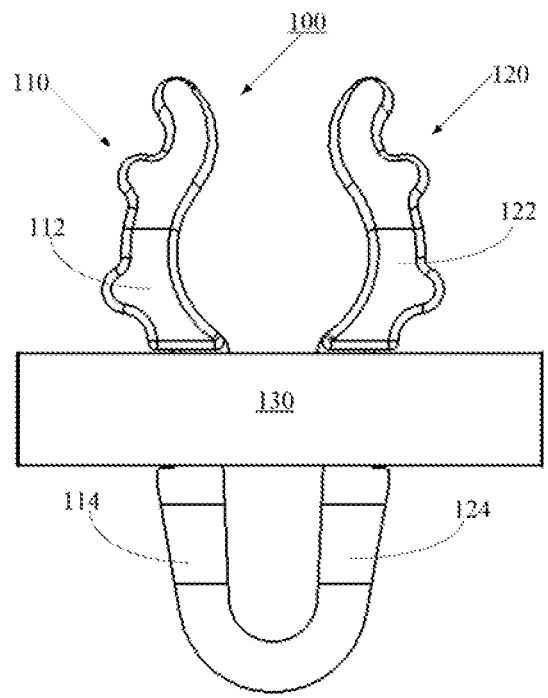
FIG. 2 shows a schematic view of a cable fixing device being fixed in a plate-shaped structure according to an example embodiment of the present disclosure.

FIG. 2 shows a schematic view of a cable fixing device 100 being fixed in a plate-shaped structure 130 according to an example embodiment of the present disclosure. As shown in FIG. 2, the cable fixing device 100 includes a first arm 110. The first arm 110 includes a first arm section 112 for holding a cable (not shown) and a second arm section 114 for fixing the cable to a plate-shaped structure 130 to which the cable fixing device is attached. In addition, the cable fixing device 100 further includes a second arm 120. The second arm 120 includes a third arm section 122 for holding the cable (not shown) and a fourth arm section 124 for fixing the cable to the plate-shaped structure 130 to which the cable fixing device is attached. The second arm section 114 and the fourth arm section 124 are connected. As shown in FIG. 2, the second arm section 114 and the fourth arm section 124 are connected through their corresponding lower ends. The first arm section 112 and the third arm section 122 are configured to cooperatively fix the cable. The first arm section 112 is connected to the third arm section 122 only through the second arm section 114 and the fourth arm section 124.

In addition, as shown in FIG. 1, in one embodiment, a first recessed arm section 113 is disposed on a side of the first arm 110 facing away from the second arm 120 at a section of the first arm 110 where the first arm section 112 and the second arm section 114 are connected together, and a second recessed arm section 123 is disposed on a side of the second arm 120 facing away from the first arm 110 at a section of the second arm 120 where the third arm section 122 and the fourth arm section 124 are connected together. In this way, before the cable is inserted between the first arm 110 and the second arm 120, the first recessed arm section 113 and the second recessed arm section 123 facilitate the cable fixing device 100 to be snapped into the plate-shaped structure 130 shown in FIG. 2 and FIG. 3. After the cable (e.g., the cable 140 having a circle cross-section in FIG. 4) is inserted between the first arm 110 and the second arm 120, the cable 140 keeps the first recessed arm section 113 and the second recessed arm section 123 snapped into the plate-shaped structure 130 more securely.

In one embodiment, the first recessed arm section 113 and the second recessed arm section 123 are configured to fix the cable fixing device 100 into an opening of the plate-shaped structure 130. The opening may be a through slot along a thickness direction of the plate-shaped structure. In one embodiment, the opening is a rectangular-shaped opening. During installation of the cable fixing device 100, the first arm 110 and the second arm 120 are pushed toward each other, such that a gap between the first arm 110 and the second arm 120 is reduced to facilitate the cable fixing device 100 to be snapped into the opening of the plate-shaped structure 130 more smoothly. A shape and a size of the opening and a shape and a size of the cable fixing device 100 match with each other to snap mechanically, thereby securing a reliable installation. After the cable fixing device 100 is inserted through the opening of the plate-shaped structure 130, the first recessed arm section 113 and the second recessed arm section 123 contact inner walls of the opening, the second arm section 114 and the fourth arm section 124 extend outward from one side of the plate-shaped structure 130 along its thickness direction (e.g., bottom side), and the first arm section 112 and the third arm section 122 extend outward from another side of the plate-shaped structure 130 along its thickness direction (e.g., top side). The cable fixing device 100 may be used in mobile communication systems and equipment. For example, the cable fixing device 100 may be used in the antenna equipment to fix the cable to the reflector plate.

Figure 3:
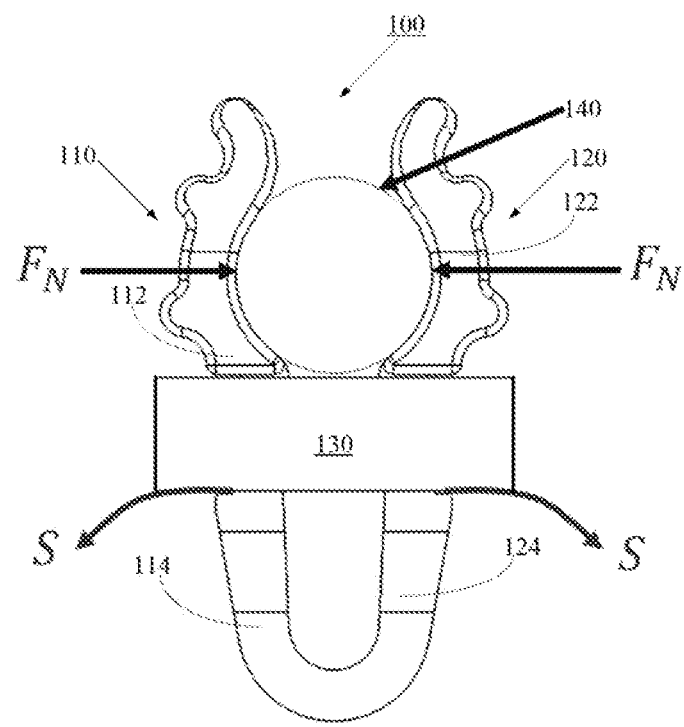
FIG. 3 shows a schematic view of a cable fixing device fixing a cable to the plate-shaped structure according to an example embodiment of the present disclosure.

In the embodiments shown in FIG. 1, FIG. 2, and FIG. 3, at least one of the first arm section 112 or the third arm section 122 includes an arc-shaped inner surface. In one embodiment, the first arm section 112 and the third arm section 122 are configured to clamp the cable (e.g., the cable 140 shown in FIG. 3).

FIG. 3 shows a schematic view of a cable fixing device 100 fixing a cable to the plate-shaped structure according to an example embodiment of the present disclosure. As shown in FIG. 3, the cable fixing device 100 includes a first arm 110. The first arm 110 includes a first arm section 112 for holding a cable 140 and a second arm section 114 for fixing the cable 140 to a plate-shaped structure 130 to which the cable fixing device is attached. In addition, the cable fixing device 100 further includes a second arm 120. The second arm 120 includes a third arm section 122 for holding the cable 140 and a fourth arm section 124 for fixing the cable 140 to the plate-shaped structure 130 to which the cable fixing device is attached. The second arm section 114 and the fourth arm section 124 are connected. As shown in FIG. 3, the second arm section 114 and the fourth arm section 124 are connected through their corresponding lower ends. The first arm section 112 and the third arm section 122 are configured to cooperatively fix the cable 140. The first arm section 112 is connected to the third arm section 122 only through the second arm section 114 and the fourth arm section 124.

During installation of the cable fixing device 100, the first arm 110 and the second arm 120 are pushed toward each other by a user, such that a gap between the first arm 110 and the second arm 120 is reduced to facilitate the cable fixing device 100 to be snapped into the opening of the plate-shaped structure 130 more smoothly. A shape and a size of the opening and a shape and a size of the cable fixing device 100 match with each other to snap mechanically, thereby securing a reliable installation. The user presses the cable 140 into a space between the first arm section 112 and the third arm section 122 of the cable fixing device 100.

In one embodiment, as shown in FIG. 3, after the cable 140 is pressed into the space between the first arm section 112 and the third arm section 122 of the cable fixing device 100, the first arm section 112 and the third arm section 122 apply forces to the cable 140 from both FN directions to securely hold the cable 140 between the first arm section 112 and the third arm section 122. Correspondingly, the cable 140 applies reverse forces in directions opposite to the FN directions to the first arm section 112 and the third arm section 122. In other words, after the cable fixing device is installed, expansion forces of the cable 140 reinforce the fixing of the cable fixing device 100 to the plate-shaped structure 130.

In one embodiment, to make it easier to press the cable 140 into the space between the first arm section 112 and the third arm section 122, an upper portion of each of the first arm section 112 and the third arm section 122 includes an arc-shaped guiding surface. The arc-shaped surfaces at the upper portions open widely to receive the cable 140 when the cable 140 is pressed into the space between the first arm section 112 and the third arm section 122.

In one embodiment, a distance between an end of the first arm section 112 facing away from the second arm section 114 and an end of the third arm section 122 facing away from the fourth arm section 124 is smaller than a maximum distance between the first arm section 112 and the third arm section 122. In this way, the cable 140 inserted between the first arm 110 and the second arm 120 is prevented from falling off. In other words, the opening of the cable fixing device 100 is smaller than the space holding the cable 140.

In one embodiment, to make it easier to fix the cable fixing device 100 without the cable 140 inserted to the plate-shaped structure 130, a mechanical tension force is configured at a bottom portion of the cable fixing device 100 connecting between the second arm section 114 and the fourth arm section 124 to keep the cable fixing device 100 in a stable shape. As such, the cable fixing device 100 without the cable 140 inserted can be pushed smoothly into the opening of the plate-shaped structure 130 while the mechanical tension force keeps the cable fixing device 100 without the cable 140 inserted to remain in the opening of the plate-shaped structure 130.

In one embodiment, after the cable 140 is pushed into the cable fixing device 100, the first arm 110 is pushed away from the second arm 120 by the inserted cable 140 and the second arm 120 is pushed away from the first arm 110 by the inserted cable 140, such that the first recessed arm section 113 and the second recessed arm section 123 are pushed away from each other as well. In this way, the inserted cable 140 pushes the first recessed arm section 113 and the second recessed arm section 123 to securely couple with the plate-shaped structure 130. As shown in FIG. 3, after the cable 140 is pressed into the space between the first arm section 112 and the third arm section 122 of the cable fixing device 100, the cable 140 pushes the cable fixing device 100 in S directions, such that the cable fixing device 100 is prevented from falling off from the plate-shaped structure 130 and the fixing between the cable fixing device 100 and the plate-shaped structure 130 becomes more secure.

In addition, in the embodiments shown in FIG. 1, FIG. 2, and FIG. 3, the first arm 110 and the second arm 120 are symmetrically arranged. In one embodiment, a distance between inner sides of the first arm 110 and the second arm 120 gradually increases along a longitudinal direction from the opening toward an inside of the cable fixing device 100. In one embodiment, the distance between the inner sides of the first arm 110 and the second arm 120 gradually decreases and then increases along the longitudinal direction from the opening toward the inside of the cable fixing device 100. In one embodiment, the distance between the inner sides of the first arm 110 and the second arm 120 gradually decreases, then increases, and decreases again along the longitudinal direction from the opening toward the inside of the cable fixing device 100.

In one embodiment, the cable fixing device 100 is configured to fix the cable 104 to the plate-shaped structure 130. The plate-shaped structure 130 may be a reflector of antenna or a circuit board of another device.

The present disclosure also provides an antenna. The antenna includes a transmitter board and the disclosed cable fixing device 100.

Figure 4:
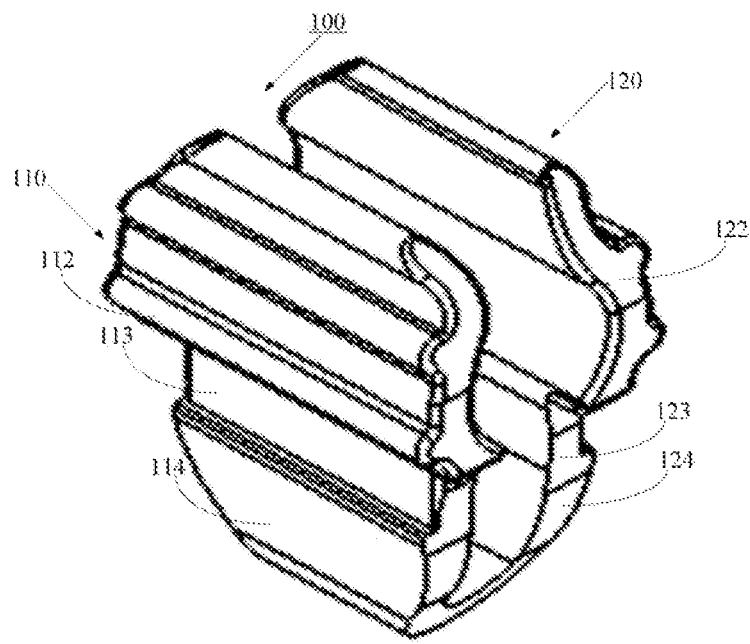
FIG. 4 shows a three-dimensional view of a cable fixing device according to an example embodiment of the present disclosure.

FIG. 4 shows a three-dimensional view of a cable fixing device according to an example embodiment of the present disclosure. As shown in FIG. 4, the cable fixing device 100 includes a first arm 110. The first arm 110 includes a first arm section 112 for holding a cable (not shown) and a second arm section 114 for fixing the cable to a plate-shaped structure (not shown) to which the cable fixing device is attached. In addition, the cable fixing device 100 further includes a second arm 120. The second arm 120 includes a third arm section 122 for holding the cable and a fourth arm section 124 for fixing the cable to the plate-shaped structure to which the cable fixing device is attached. The second arm section 114 and the fourth arm section 124 are connected. As shown in FIG. 4, the second arm section 114 and the fourth arm section 124 are connected through their corresponding lower ends. The first arm section 112 and the third arm section 122 are configured to cooperatively fix the cable. The first arm section 112 is connected to the third arm section 122 only through the second arm section 114 and the fourth arm section 124.

In the foregoing embodiments of the present disclosure, the cable fixing device effectively saves the installation space to much smaller than the would-be installation space needed for the ordinary cable clamps. In addition, the cable fixing device according to the present disclosure improves the cable installation process, such that the installation is simple, easy to operate, and highly efficient. The cable fixing device according to the present disclosure fixes the cable which at the same time reinforces the fixing of the cable clamp. The reverse force by the cable makes the overall fixing more reliable. Moreover, the cable fixing device according to the present disclosure has a high fault tolerance and reduces impacts of material contraction and expansion and size deviations.

Figure 5A:
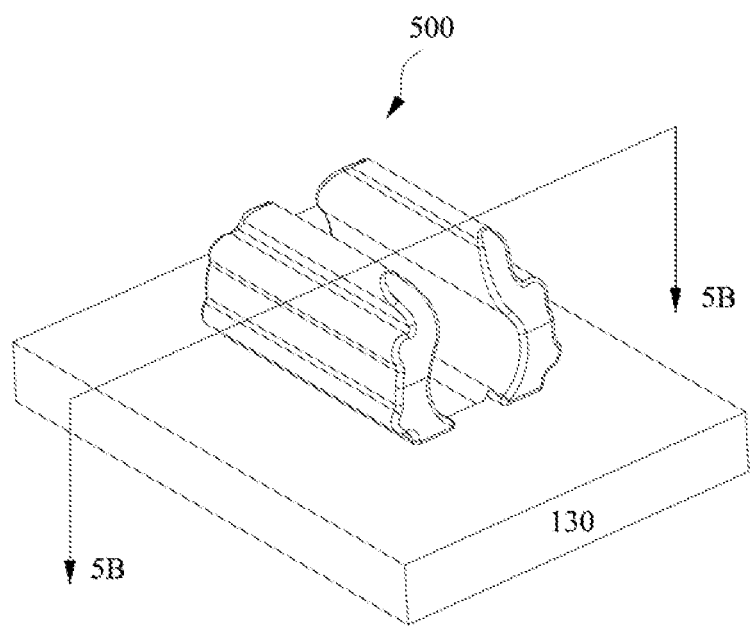
FIG. 5A illustratively depicts a perspective view of a cable fixing device relative to a plate-shaped structure.
Figure 5B:
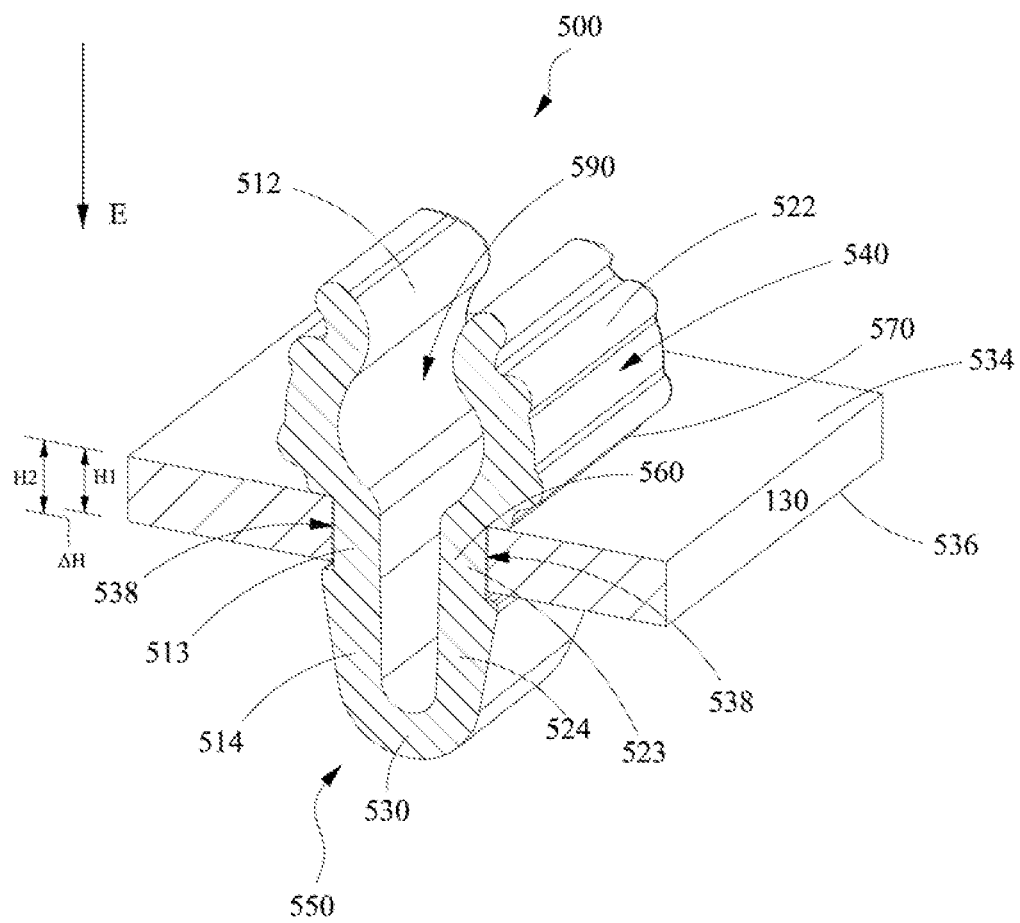
FIG. 5B illustratively depicts a cross-section taken along line 5B-5B of the cable fixing device of FIG. 5A.

In certain embodiment(s), a cable fixing device 500 is illustratively depicted in FIG. 5B in view of FIG. 5A, relative to the plate-shaped structure 130. The cable fixing device 500 includes an upper body 540, a lower body 550, and a middle body 560 positioned between the upper body 540 and the lower body 550 along an engagement direction E. Although the engagement direction E is depicted in the moving down arrow shown, the engagement direction E does not have to be in the moving down direction, and may also indicate a direction moving up from the perspective of the cable fixing device 500. The engagement direction E demonstrates a movement direction of the cable fixing device 500 moving towards and engages with the plate-shaped structure 130 or a direction of the plate-shaped structure 130 moving towards and engages with the cable fixing device 500. The upper body 540 includes a first arm section 512 and a third arm section 522 to receive and hold a cable, such as the cable 140. The lower body 550 includes a second arm section 514 and a fourth arm section 524 connected to each other via an arm section joint 530. The middle body 560 includes a first recessed arm section 513 and a second recessed arm section 523 to be contacting the plate-shaped structure 130.

Further in view of FIG. 5B, which is a cross-section taken along line 5B-5B of FIG. 5A, the upper body 540 is to hold the cable 140, the lower body 550 is to travel through an opening 570 of the plate-shaped structure 130 along the engagement direction E to pass a face surface 534 of the plate-shaped structure 130 and then pass a back surface 536 of the plate-shaped structure 130, and the middle body is to contact a sidewall 538 of the opening 570 of the plate shaped structure 130, where a height H1 of the sidewall 538 of the opening 570 of the plate-shape structure 130 is smaller than a height H2 of the middle body 560 along the engagement direction E.

In certain embodiment(s), the upper body 540, the lower body 550, and the middle body 560 are integral to each other. This may be achieved by injection molding or three-dimensional printing of a single or composite material. Non-limiting examples of the single or composite material include a resin, a polymer, a composite, or any suitable combinations thereof.

In certain embodiment(s), the upper body 540 differs from the middle body 560 in material, the upper body 540 differs from the lower body 550 in material, or the middle body 560 differs from the lower body 550 in material. For example, and to impart greater elasticity or expandability to the upper body 540, the upper body 540 may be formed of a resin or a polymer that is more flexible than a material forming the middle body 560. For example, and to impart greater rigidity to the middle body 560 so as to better withstand the counter-force imparted by the sidewall 538 of the plate-shaped structure 130, the middle body 560 may be formed of a resin or a polymer that is less flexible than a material forming the lower body 550 or the upper body 540. When formed of different materials, the upper body 540, the middle body 560, and the lower body 550 may be attached to each other by any suitable adhesives, such as a polymeric glue.

Figure 6:
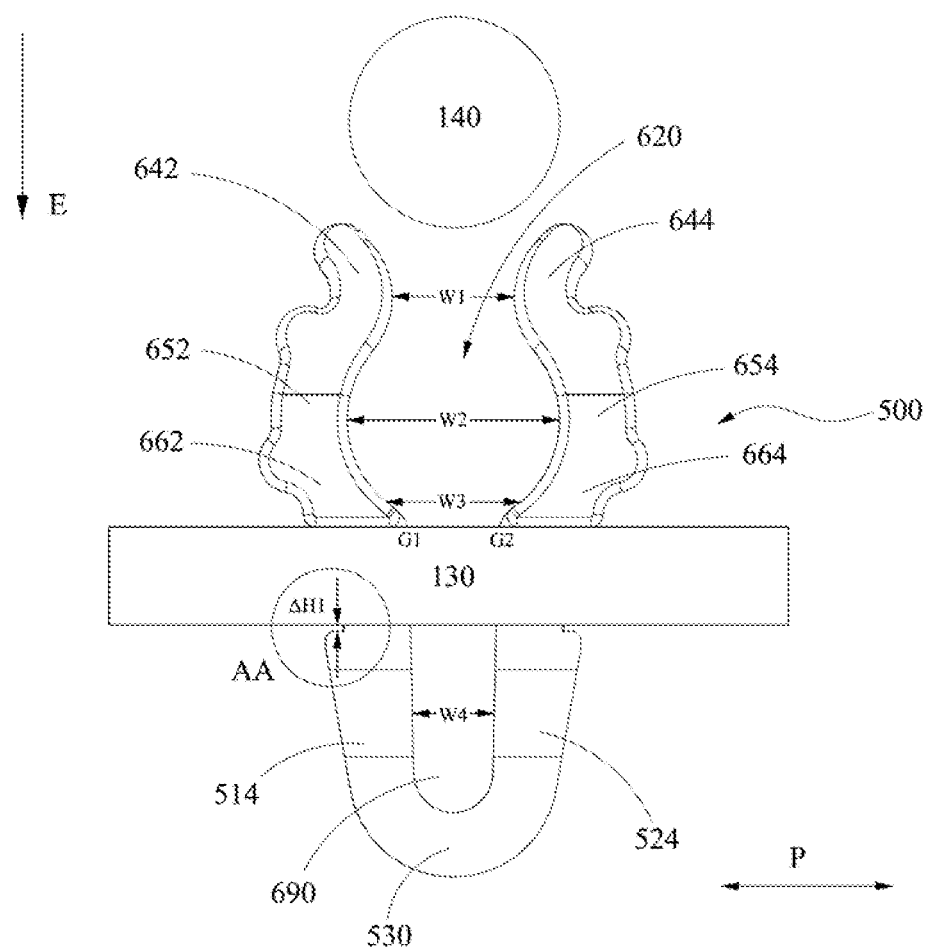
FIG. 6 illustratively depicts a cross-section view of the cable fixing device of FIG. 5B relative to a cable.

In certain embodiment(s), and in view of FIG. 6, the upper body 540 defines a passageway 620 extending along the engagement direction E for the cable 140 to travel through along the engagement direction E. The passageway 620 defines a neck width W1, a chest width W2, and a waist width W3 along the engagement direction E, and the chest width is larger than the neck width W1 or the waist width W3 at a first position, such as the position illustratively depicted in FIG. 6, where and when the cable fixing device 500 is separate from the cable 140, or the cable 140 has not yet come into contact with the cable fixing device 500.

The neck width W1 may be defined by a first neck portion 642 and a second neck portion 644 of the upper body 540 that protrude towards each other along a planar direction P. The planar direction P is a direction along which the face surface 534 of the plate-shaped structure 130 extends and/or the back surface 536 of the plate-shaped structure 130 extends. Viewing from inside of the passageway 620, the first neck portion 642 and the second neck portion 644 appear to define a portion of the passageway 620 that is convex in shape.

The chest width W2 may be defined by a first chest portion 652 and a second chest portion 654 of the upper body 540 that protrude away from each other along the planar direction P. Viewing from inside of the passageway, the first chest portion 652 and the second chest portion 654 appear to define a portion of the passageway 620 that is concave in shape.

The waist width W3 may be defined by a first waist portion 662 and a second waist portion 664 of the upper body 540 that protrude toward each other along the planar direction P. Viewing from inside of the passageway, the first waist portion 662 and the second waist portion 664 appear to define a portion of the passageway 620 that is concave in shape.

Figure 7:
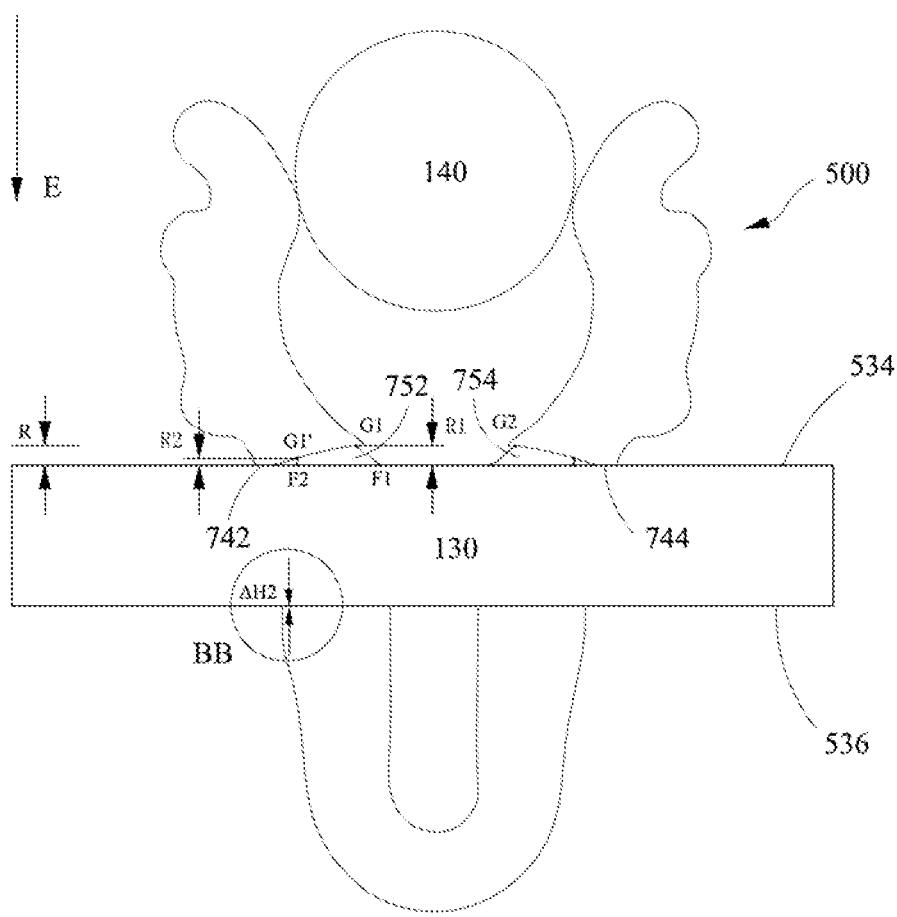
FIG. 7 illustratively depicts a cross-section of the cable fixing device of FIG. 5B relative to a cable.

In certain embodiment(s), FIG. 6 illustratively depicts the first position, where or when which the cable fixing device 500 is separate from the cable 140, while FIG. 7 illustratively depicts a second position, where or when the cable starts contacting the cable fixing device 500 and travels down along the engagement direction E to be eventually received within the passageway 620. While at the second position, the neck width W1 is enlarged to allow the cable to travel along the engagement direction E. The enlargement of the neck width W1 is a result of the cable 140 being pressed down along the engagement direction E, and the pressing down may be imparted by an operator's hand force or by any suitable machinery tools. As the cable 140 travels down through the passageway 620 along the engagement direction E, one or more ribs 742 and 744 of the upper body 540 press down on the face surface 534 of the plate-shaped structure 130 along the engagement direction E while the lower body 550 rides up in a direction opposite of the engagement direction to reduce a height difference (ΔH) between H1 and H2. The riding up of the lower body 550 is a result of the one or both ribs 742 and 744 pressing down on the plate-shaped structure 130, via for example a lever mechanism.

Figure 8:
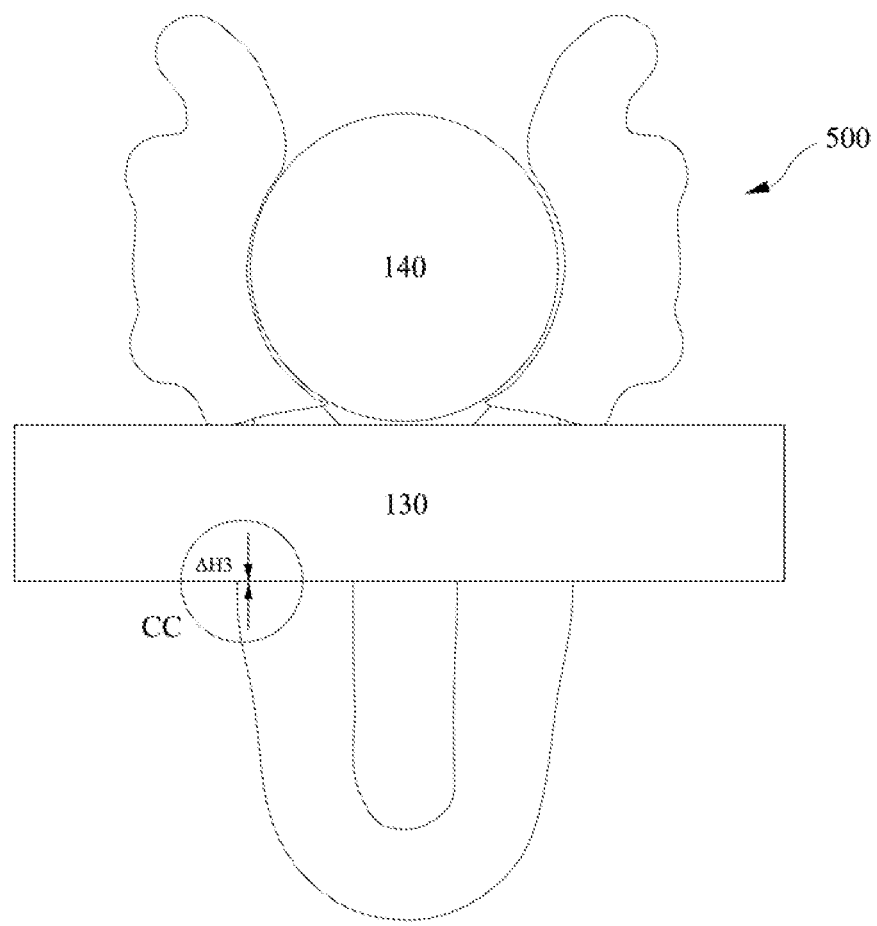
FIG. 8 illustratively depicts a cross-section of the cable fixing device of FIG. 5B relative to a cable.

Referring back to FIG. 6, the height difference ΔH is located in an area AA closer to the back surface 536 than to the face surface 534 of the plate-shaped structure. The height difference ΔH reduces or diminishes in value from ΔH1 to ΔH2 as the cable 140 continues to travel down along the engagement direction E. The reduced or diminished height difference ΔH is shown in an area BB of FIG. 7. As the cable 140 continues to travel along the engagement direction E and rests inside the passageway 620, as illustratively depicted in FIG. 8. The height difference ΔH may continue to reduce or diminish in value from ΔH2 to ΔH3 as the cable 140 continues to travel down along the engagement direction E.

Figure 12:
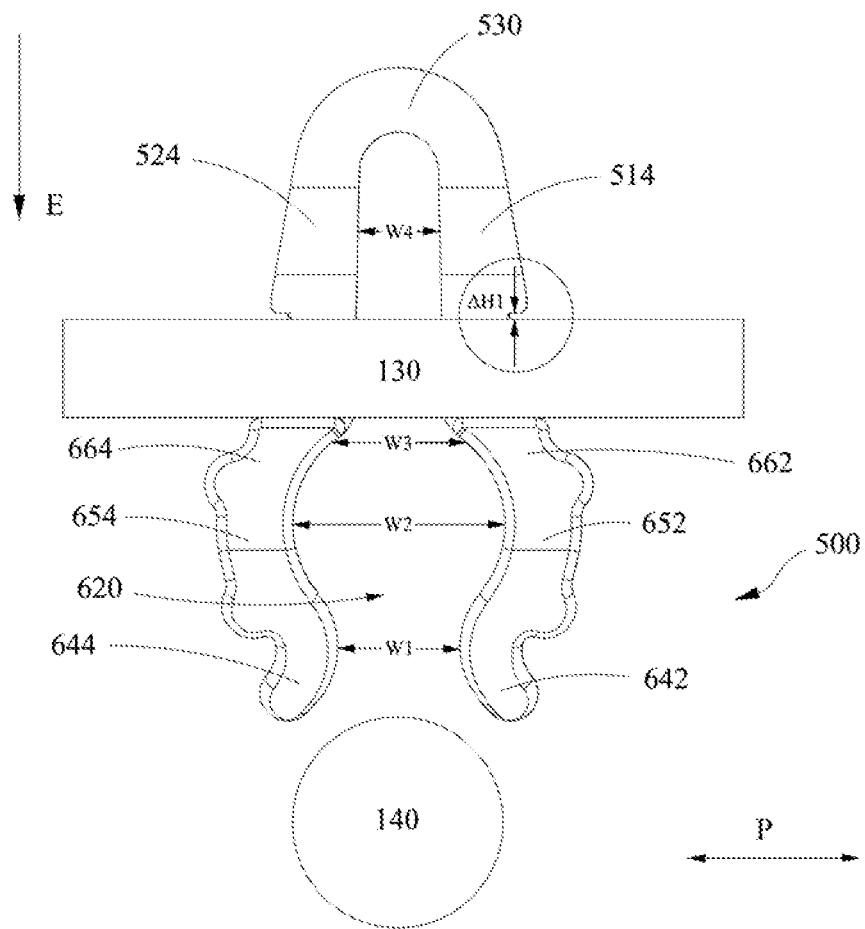
FIG. 12 illustratively depicts a cross-section view of the cable fixing device of FIG. 5B relative to a cable.

In certain embodiment(s), and as illustratively depicted in FIG. 12, the lower body 550 of the cable fixing device 500 is shown positioned above the face surface 534 of the plate-shaped structure 130, as a comparative alternative to FIG. 6, where the lower body 550 of the cable fixing device 500 is shown positioned below the face surface 534 of the plate-shaped structure 130.

Height difference ΔH1 may be of any suitable values. Non-limiting examples of a value range of the Height difference ΔH1 are 1.0 millimeters to 20.0 millimeters, 2.0 millimeters to 15.0 millimeters, and 5.0 millimeters to 10.0 millimeters. In certain embodiment(s), the height difference ΔH1 may be related to a thickness T defined between the face surface 534 and the back surface 536 of the plate-shaped structure 130, for example, in a range of 0.01 to 1.0 T, 0.25 T to 0.75 T, or 0.25 T to 0.5 T.

In certain embodiment(s), and as illustratively depicted in FIG. 5B, FIG. 6, FIG. 7, and FIG. 8, the height difference ΔH is shown positioned closer to the back surface 536 than the face surface 534. In certain other embodiment(s), the height difference ΔH may be positioned (not shown) closer to the face surface 534 than the back surface 536.

Referring back to FIG. 7, as the cable 140 travels down, the first and second neck portions 642 and 644 opens outwardly, the ribs 742 and/or 744 press down on the face surface 534 of the plate-shaped structure 130, and the lower body 550 rides up, a stretch area 752, 754 start to form or appear in the waist portion 662 and 664, as a compensatory mechanism to account for the reduction or disappearance of the height difference ΔH.

At the first position, the cable fixing device is separate from the cable; and at the second position, the cable fixing device contacts the cable, and a stretch area of the middle portion rides above a face surface of the plate-shaped structure so as to be positioned between the cable and the face surface of the plate-shaped structure.

The stretch areas 752, 754 may each be indicated with a height R along the engagement direction E. In comparison to FIG. 6, where the width W3 may define the distance between points G1 and G2 of the upper body 540, FIG. 7 illustratively depicts moving up of the points G1 and G2 away from the face surface 534. Consequently, material from the middle portion 560 is displaced to accommodate the moving away of the points G1 and G2, and the material thus displaced forms at least a portion of the stretch areas 752, 754. The height R corresponds to the moving up of the points G1 and G2 away from the face surface 534. Moreover, the material displacement tapers off along the planar direction P further out and away from the passageway 620. For example, and as illustratively depicted in FIG. 7, the stretch area 752 is defined by G1 and G1' of the upper body 540, and F1 and F2 of the middle body 560. The distance R measured between point G1 and point F1 is R1, and the distance R measured between points G1' and point F2 is R2, where R1 is greater than R2.

Distance R1 and R2 may be of any suitable values. Non-limiting examples of a value range of the distance R1 are 0.5 millimeters to 10.0 millimeters, 1.0 millimeters to 5.0 millimeters, and 1.5 millimeters to 3.0 millimeters. Non-limiting examples of a value range of the distance R2 are 0.05 millimeters to 1.0 millimeters, 0.1 millimeters to 0.5 millimeters, and 0.15 millimeters to 0.3 millimeters. In certain embodiment(s), the distance R1 may be related to the thickness T defined between the face surface 534 and the back surface 536 of the plate-shaped structure 130, for example, in a range of 0.01 to 1.0 T, 0.25 T to 0.75 T, or 0.25 T to 0.5 T.

Figure 10:
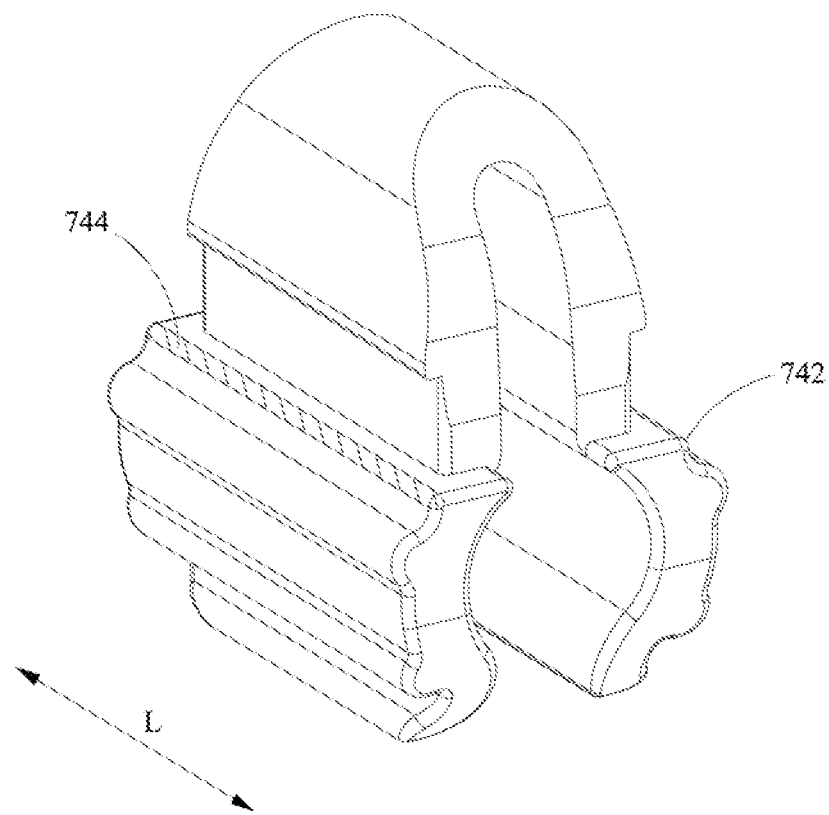
FIG. 10 illustratively depicts a perspective view of the cable fixing device of FIG. 5B.

A perspective view of the ribs 742 and 744 is illustratively depicted in FIG. 10, where the ribs 742 and 744 are shown to extend along a length direction L. The length direction L may be a direction along which the cable 140 extends.

The pressing-down of the plate-shaped structure 130 by the rib 742 and 744, and the riding-up of the lower body 550 together further secure the holding of the cable 140 and reduce unwanted wiggles along the engagement direction E.

Referring back to FIG. 6, and in certain embodiment(s), the lower body 550 defines a cavity 690. The cavity 690 allows the lower body 550 to move inwardly or otherwise to temporally deform as the lower body 550 travels through the opening 570 of the plate-shaped structure 130 along the engagement direction E.

In certain embodiment(s), the cavity 690 may be of a tail width W4 smaller than the chest width W2 of the upper body 540. In certain embodiment(s), the tail width W4 of the cavity 690 may be smaller than the neck width W1 or the waist width W3 of the upper body 540.

In certain embodiment(s), the cavity 690 is part of a passageway defined by the upper body 540, the middle body 560, and the lower body 550. The cavity 690 may be part of the passageway 620 depicted in FIG. 6. Referring back to FIG. 5B, a passageway 590 is illustratively depicted to show a cavity continues from the upper body 540, through the middle body 560, and all the way into the lower body 550.

Figure 9A:
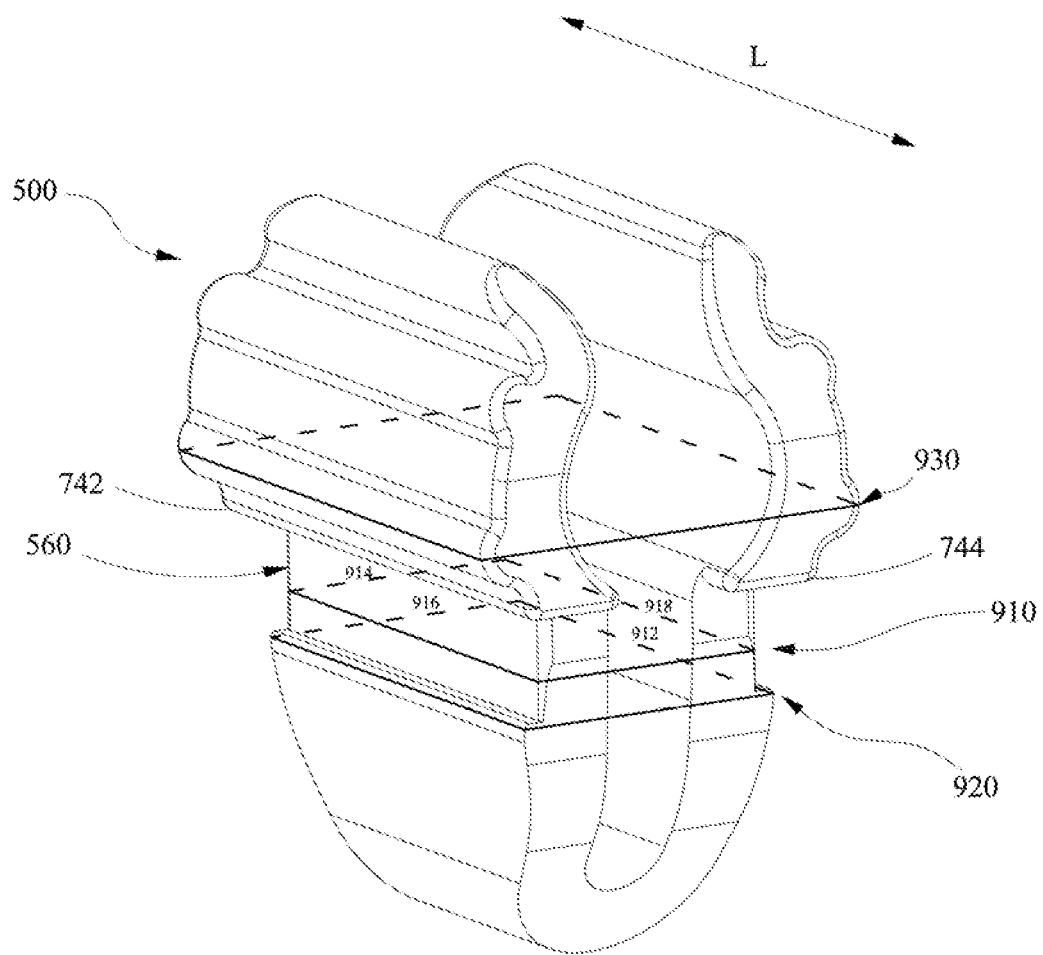
FIG. 9A illustratively depicts a perspective view of the cable fixing device of FIG. 5B.

In certain embodiment(s), and further in view of FIG. 9A, a cross-section 910 of the middle body 560 taken along the planar direction (P) is four-sided, including a front side 912, a back side 914, a left side 916, and a right side 918, where one or both of the left side 916 and the right side 918 extend along the length direction L of the cable 140.

Although illustratively depicted in FIG. 9A as being of a four-sided shape, the cross-section 910 may be of any other suitable shapes and of any suitable number of sides. In certain embodiment(s), the cross-section 910 may be of a shape with sides in a number different than four, such as of a three-sided shape or a five-sided shape, may be of a shape of curved sides, such as an oval or elongated oval, and may be of a shape including one or more straight sides and one or more curved sides.

Referring back to FIG. 9A, a cross-section 920 of the lower body 550 taken along the planar direction (P) is larger in dimension than the cross-section 910 of the middle body 560, to resist disengagement of the plate-shaped structure 130 out through the lower body 550. A cross-section 930 of the upper body 540 taken along the planar direction P is also larger in dimension than the cross-section 910 of the middle body 560, to resist disengagement of the plate-shaped structure 130 out through the upper body 540. The cross-section 920, the cross-section 910, and the cross-section 930 collectively configure the middle body 560 to be a recess area relative to the upper body 540 and the lower body 550, so as to further improve engagement of the plate-shaped structure 130 relative to the cable fixing device 500.

Figure 9B:
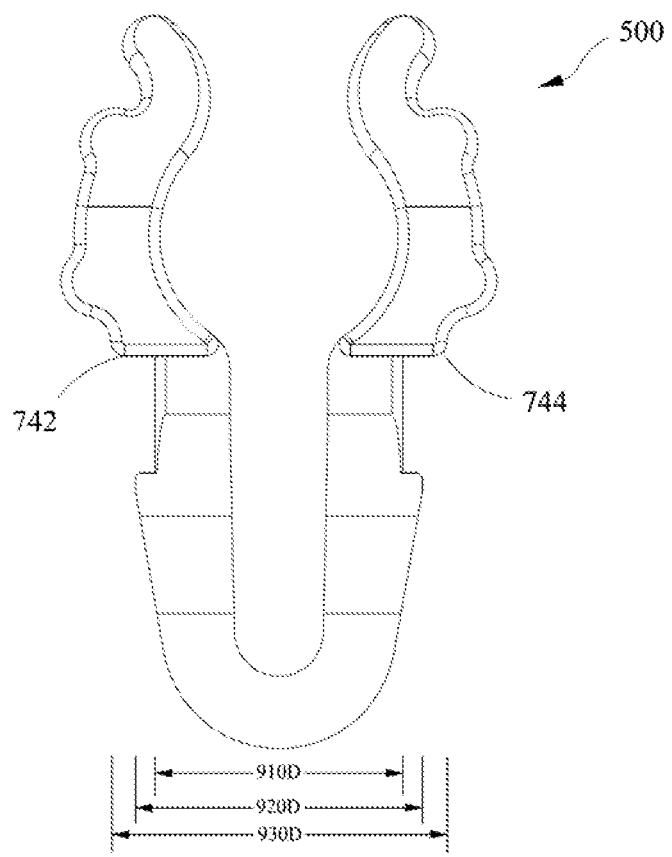
FIG. 9B illustratively depicts a cross-section of the perspective view of the cable fixing device of FIG. 5B.

Further in view of FIG. 9B, the cross-section 910 referenced in FIG. 9A is of a dimension 910D, the cross-section 920 referenced in FIG. 9A is of a dimension 920D, and the cross-section 930 referenced in FIG. 9A is of a dimension 930D.

Although being illustratively depicted for example in FIG. 9A as being a circle in cross-section, the cable 140 may be of any suitable shapes in cross-section, for example, of a cross-section in the shape of an oval, or a shape with one or more straight sides and one or more curve sides.

In another aspect, a cable holding assembly is provided. The cable holding assembly includes a cable fixing device such as the cable fixing device 500 and a plate-shaped structure such as the plate-shaped structure 130. As included in the cable holding assembly, the cable fixing device and the plate-shaped structure may be separate from each other for the ease of packaging and shipping, or may be pre-assembled into a structure such as one illustratively depicted in FIG. 5A or FIG. 5B for improved user-friendliness. In the pre-assembled format, the plate-shaped structure 130 may be provided with two or more openings, and number, locations, and/or sizes of the openings may be customized to receive cable fixing devices of variable sizes or material in response to particular implementation details.

Figure 11:
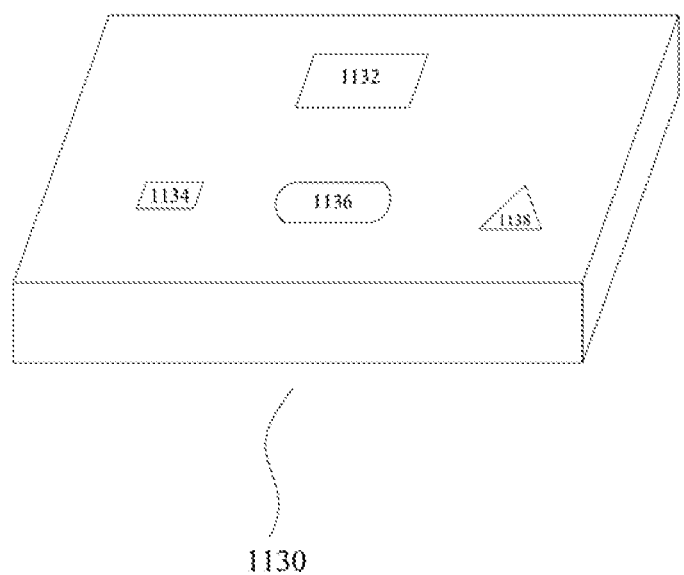
FIG. 11 illustratively depicts a perspective view of a plate-shaped structure.

In certain embodiment(s), and further in view of FIG. 11, a plate-shaped structure such as the plate-shaped structure 130 may be provided with two or more openings, which may be of the same opening dimensions or different opening dimensions. In certain particular embodiment(s), as illustratively depicted in FIG. 11, one or more openings with larger opening dimensions are defined to accommodate one or more cable fixing devices for holding one or more cables with correspondingly bigger cable dimensions, and one or more openings with smaller opening dimensions are defined to accommodate one or more cable fixing devices for holding one or more cables with correspondingly smaller cable dimensions. In certain other particular embodiment(s), one or more those openings with bigger opening dimensions may be used in mix-n-match or any suitable combinations with one or more openings with smaller opening dimensions to accommodate cable with variable cable dimensions along its length direction.

The openings of the plate-shaped structure such as the one illustratively depicted in FIG. 11 may be custom designed in location and size to meet a custom order, and size-matching cable fixing devices may be provided along with the plate-shaped structure. As provided in an assembly format, the plate-shaped structure and the cable fixing device may be engaged like the one illustratively depicted in FIG. 5A and FIG. 5B, or may stay separate from each other in the package. When provided in the engagement format, upon being released from the package, the cable holding assembly is readily available for installation and for holding a cable, therefore helps realize greater efficiencies in labor and shortened installation time.

Referring back to FIG. 11, the plate-shaped structure 1130 may include an opening 1132 that is relatively larger in dimension, may include an opening 1134 that is relatively smaller in dimension, may include an opening 1136 that is of a shape with one or more curved sides and/or one or more straight sides, and/or may include an opening 1138 that is three-sided in shape.

In another aspect, a cable holding assembly is provided to include a cable such as the cable 140 and a cable fixing device such as the cable fixing device 500. In this form of an assembly, one or more cables may be provided in same or variable sizes, and one or more size-matching cable fixing devices may be provided in same or variable sizes. The one or more cables and the one or more cable fixing devices may be provided as being separate from each other, and optionally color-coded to show size coordination. In certain embodiment(s), the one or more cables and the one or more cable fixing devices are so designed such that having the cable pre-engaged to its corresponding cable fixing device may prevent such engaged unit from freely entering the opening of the plate-shaped structure in an unwanted scenario.

Although various embodiments of the present disclosure have been described, it is apparent to those skilled in the art that various changes and modifications can be made without departing from the spirit and scope of the present disclosure to achieve one or more advantages of the present disclosure. For those skilled in the art, one or more components may be replaced by other components performing the identical functions. It should be understood that the features described herein with reference to a particular drawing can be combined with another feature in another drawing, even if such a case is not explicitly mentioned. In addition, the method of present disclosure may be implemented all by software being executed by a processor or may be implemented in a hybrid manner by a combination of hardware logic and software logic to achieve the same result. Such modifications to the embodiments of the present disclosure are intended to be covered by the appended claims.

What is claimed is:

1. A cable fixing device, comprising:
an upper body to contact a cable;
a lower body to travel through an opening of a plate-shaped structure along an engagement direction; and
a middle body positioned between the upper body and the lower body along the engagement direction, the middle body comprising recessed arms, the recessed arms substantially following a profile of a side wall of the opening and each contacting the side wall of the opening of the plate-shaped structure, wherein a height H1 of the sidewall of the opening of the plate-shape structure along the engagement position is smaller than a height H2 of the middle body along the engagement direction, and wherein a height difference ΔH between H2 and H1 decreases as the cable travels through the upper body along the engagement direction.

2. The cable fixing device of claim 1, wherein the upper body, the lower body, and the middle body are integral to each other.

3. The cable fixing device of claim 1, wherein the upper body differs from the middle body in material, the upper body differs from the lower body in material, or the middle body differs from the lower body in material.

4. The cable fixing device of claim 1, wherein the upper body defines a passageway extending along the engagement direction for the cable to travel through along the engagement direction, the passageway defining a neck width (W1), a chest width (W2), and a waist width (W3) along the engagement direction, and wherein the chest width is larger than the neck width or the waist width.

5. The cable fixing device of claim 4,
wherein at a first position, the upper body is separate from the cable; and
wherein at a second position, the upper body contacts the cable, the neck width is enlarged to allow the cable to travel through the passageway along the engagement direction, and a rib of the upper body presses on the plate-shaped structure while the lower body rides up in a direction opposite of the engagement direction to reduce the height difference (ΔH) between H1 and H2.

6. The cable fixing device of claim 1, wherein:
at a first position, the cable fixing device is separate from the cable; and
at a second position, the cable fixing device contacts the cable, and a stretch area of the middle body rides above a face surface of the plate-shaped structure to be positioned between the cable and the face surface of the plate-shaped structure.

7. The cable fixing device of claim 1, wherein the lower body defines a cavity.

8. The cable fixing device of claim 7, wherein the cavity is of a tail width (W4) smaller than the chest width of the upper body.

9. The cable fixing device of claim 8, wherein the tail width of the cavity defined by the lower body is smaller than the neck width or the waist width of the upper body.

10. The cable fixing device of claim 7, wherein the cavity is part of a passageway defined by the upper body, the middle body, and the lower body.

11. The cable fixing device of claim 1, wherein a cross-section of the middle body along a planar direction (P) is four-sided, including a front side, a back side, a left side, and a right side, wherein one or both of the left side and the right side extends along a length direction of the cable at an engagement position.

12. A cable fixing assembly, comprising: a plate-shaped structure and a cable fixing device, wherein the cable fixing device comprises:
an upper body to contact a cable;
a lower body to travel through an opening of the plate-shaped structure along an engagement direction; and
a middle body positioned between the upper body and the lower body along the engagement direction, the middle body comprising recessed arms, the recessed arms substantially following a profile of a side wall of the opening and each contacting the side wall of the opening of the plate-shaped structure, wherein a height H1 of the sidewall of the opening of the plate-shape structure along the engagement position is smaller than a height H2 of the middle body along the engagement direction, and wherein a height difference ΔH between H2 and H1 decreases as the cable travels through the upper body along the engagement direction.

13. The cable fixing assembly of claim 12, wherein the upper body, the lower body, and the middle body of the cable fixing device are integral to each other.

14. The cable fixing assembly of claim 12, wherein the upper body defines a passageway extending along the engagement direction for the cable to travel through along the engagement direction, the passageway defining a neck width (W1), a chest width (W2), and a waist width (W3) along the engagement direction, and wherein the chest width is larger than the neck width or the waist width.

15. The cable fixing assembly of claim 14,
wherein at a first position, the upper body is separate from the cable; and
wherein at a second position, the upper body contacts the cable, the neck width is enlarged to allow the cable to travel through the passageway along the engagement direction, and a rib of the upper body presses on the plate-shaped structure while the lower body rides up in a direction opposite of the engagement direction to reduce the height difference (ΔH) between H1 and H2.

16. The cable fixing assembly of claim 12, wherein the plate-shaped structure is a reflector plate.

17. The cable fixing assembly of claim 12, wherein the lower body defines a cavity, and the cavity is of a tail width (W4) smaller than the chest width of the upper body.

18. A cable fixing assembly, comprising: a cable and a cable fixing device, wherein the cable fixing device comprises:
- an upper body to contact the cable;
- a lower body to travel through an opening of a plate-shaped structure along an engagement direction; and
- a middle body positioned between the upper body and the lower body along the engagement direction, the middle body comprising recessed arms, the recessed arms following a profile of a side wall of the opening and each contacting the side wall of the opening of the plate-shaped structure, wherein a height H1 of the sidewall of the opening of the plate-shape structure along the engagement position is smaller than a height H2 of the middle body along the engagement direction, and wherein a height difference ΔH between H2 and H1 decreases as the cable travels through the upper body along the engagement direction.

19. The cable fixing assembly of claim 18, wherein the upper body defines a passageway extending along the engagement direction for the cable to travel through along the engagement direction, the passageway defining a neck width (W1), a chest width (W2), and a waist width (W3) along the engagement direction, and wherein the chest width is larger than the neck width or the waist width.

20. The cable fixing assembly of claim 18, wherein a thickness of the plate-shaped structure is T, the height difference ΔH at a first position where the upper body is separate from the cable is ΔH1, and ΔH1 is positively related to T.

* * * * *